US011661501B2

(12) United States Patent
Cottle et al.

(10) Patent No.: US 11,661,501 B2
(45) Date of Patent: *May 30, 2023

(54) BIMODAL HIGH-DENSITY POLYETHYLENE RESINS AND COMPOSITIONS WITH IMPROVED PROPERTIES AND METHODS OF MAKING AND USING THE SAME

(71) Applicant: INEOS Olefins & Polymers USA, a division of INEOS USA LLC, League City, TX (US)

(72) Inventors: Joshua Allen Cottle, Houston, TX (US); Mark Anthony Gessner, Houston, TX (US); Robert Ernest Sander, Houston, TX (US); Luc Dheur, Brussels (BE)

(73) Assignee: INEOS OLEFINS & POLYMERS USA, A DIVISION OF INEOS USA LLC, League City, TX (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/035,517

(22) Filed: Sep. 28, 2020

(65) Prior Publication Data

US 2021/0009792 A1 Jan. 14, 2021

Related U.S. Application Data

(63) Continuation-in-part of application No. 15/839,256, filed on Dec. 12, 2017, now Pat. No. 10,787,563, which is a continuation of application No. 14/369,470, filed as application No. PCT/US2012/071432 on Dec. 21, 2012, now Pat. No. 9,873,782.

(60) Provisional application No. 61/631,209, filed on Dec. 29, 2011.

(51) Int. Cl.
*C08L 23/16* (2006.01)
*C08F 210/16* (2006.01)
*C08L 23/06* (2006.01)
*C08J 3/00* (2006.01)
*C08L 23/08* (2006.01)
*C08L 23/26* (2006.01)

(52) U.S. Cl.
CPC ............. *C08L 23/06* (2013.01); *C08J 3/005* (2013.01); *C08L 23/0815* (2013.01); *C08F 210/16* (2013.01); *C08J 2323/06* (2013.01); *C08J 2323/08* (2013.01); *C08L 2023/40* (2013.01); *C08L 2203/18* (2013.01); *C08L 2205/02* (2013.01); *C08L 2205/025* (2013.01); *C08L 2207/062* (2013.01)

(58) Field of Classification Search
CPC .... C08F 210/16; C08F 2/001; C08F 2500/05; C08F 2500/07; C08F 2500/12; C08F 2500/39; C08L 23/16; C08L 23/04; C08L 2203/18
See application file for complete search history.

(56) References Cited

U.S. PATENT DOCUMENTS

| 5,486,419 | A | 1/1996 | Clementini et al. |
| 6,946,521 | B2 * | 9/2005 | Miserque ............... C08F 210/16 525/240 |
| 7,037,977 | B2 * | 5/2006 | Miserque ................ C08L 23/04 525/191 |
| 8,443,846 | B2 | 5/2013 | Hagstrand et al. |
| 9,321,903 | B2 | 4/2016 | Anker et al. |
| 9,522,988 | B2 | 12/2016 | Anker et al. |
| 9,587,055 | B2 | 3/2017 | Chai et al. |
| 9,873,782 | B2 * | 1/2018 | Cottle .................. C08L 23/0815 |
| 10,787,563 | B2 * | 9/2020 | Cottle ....................... C08L 23/06 |
| 2007/0276111 | A1 | 11/2007 | Goldberg et al. |
| 2008/0161497 | A1 | 2/2008 | Van Dun et al. |
| 2008/0097054 | A1 * | 4/2008 | Amos ................... C08F 210/16 526/135 |
| 2008/0161526 | A1 | 7/2008 | Guenther |
| 2009/0035545 | A1 | 2/2009 | Guenther et al. |
| 2009/0088534 | A1 | 4/2009 | Scheie et al. |

(Continued)

FOREIGN PATENT DOCUMENTS

WO WO 2014/126839 8/2014

OTHER PUBLICATIONS

International Preliminary Report on Patentability for International Application No. PCT/US2012/071432, dated May 12, 2015 from the International Bureau of WIPO.
International Search Report for International Application No. PCT/US2012/071432, dated May 8, 2015 from the International Bureau of WIPO.
International Standard ISO 9080:2012(E).
Christopher W. Macosco, Rheology: Principles, Measurements, and Applications 141 (1994), VCH Publishers, Inc. USA.

(Continued)

*Primary Examiner* — Rip A Lee

(74) *Attorney, Agent, or Firm* — Finnegan, Henderson, Farabow, Garrett & Dunner, LLP

(57) ABSTRACT

Bimodal high-density polyethylene polymer compositions with increased high melt strength and good processability. The compositions comprise a base resin having a density of about 945 kg/m$^3$ to about 955 kg/m$^3$, and an ethylene polymer (A) having a density of at least about 968 kg/m$^3$, in an amount ranging from 45% to 55% by weight and an ethylene polymer (B) having a density lower than the density of polymer (A). The composition has a complex viscosity at a shear rate of 0.01 rad/s ranging from about 200 to 450 kPa·s and a complex viscosity at a shear rate of 100 rad/s ranging from about 1900 to 2500 Pa·s. Articles made from these compositions, such as pipes and fittings achieve long-term oxidative resistance and have a low wall thickness variability while maintaining high production output.

25 Claims, No Drawings

(56) References Cited

U.S. PATENT DOCUMENTS

| | | |
|---|---|---|
| 2011/0151161 A1 | 6/2011 | Malm et al. |
| 2011/0174413 A1 | 7/2011 | Ashbaugh |
| 2012/0031495 A1 | 2/2012 | Vogt et al. |
| 2012/0302681 A1 | 11/2012 | Neubauer |
| 2013/0197136 A1 | 8/2013 | Hagstrand et al. |
| 2014/0004287 A1 | 1/2014 | Baker et al. |
| 2015/0090671 A1 | 4/2015 | Hjertberg et al. |
| 2017/0089503 A1 | 3/2017 | Gauthier et al. |
| 2018/0030252 A1 | 2/2018 | Mavridis et al. |
| 2019/0071561 A1 | 3/2019 | Boerakker et al. |
| 2019/0284315 A1 | 9/2019 | Rohatgi et al. |

OTHER PUBLICATIONS

Notification Concerning Transmittal of International Preliminary Report on Patentability (Chapter 1 of the Patent Cooperation Treaty) for International Application No. PCT/US2012/071432, dated May 21, 2015 from the International Bureau of WIPO.

Written Opinion of the International Searching Authority for International Application No. PCT/US2012/71432, dated Mar. 5, 2013 from the International Searching Authority.

\* cited by examiner

BIMODAL HIGH-DENSITY POLYETHYLENE RESINS AND COMPOSITIONS WITH IMPROVED PROPERTIES AND METHODS OF MAKING AND USING THE SAME

CROSS REFERENCE TO RELATED APPLICATIONS

This application is a continuation-in-part of U.S. application Ser. No. 15/839,256, filed Dec. 12, 2017, now U.S. Pat. No. 10,787,563, which is a continuation of Ser. No. 14/369,470, filed Jun. 27, 2014, now U.S. Pat. No. 9,873,782, issued Jan. 23, 2018, which is a national phase filing of PCT/US2012/071432, filed Dec. 21, 2012, which claims priority to U.S. Provisional Patent Application No. 61/631,209, filed Dec. 29, 2011, the content of all are incorporated herein by reference in their entirety.

The present disclosure relates to polyethylene resins, more particularly those suitable for use as pipes, pipe attachments or fittings, and processes for producing such resins. The present disclosure also relates to the use of polyethylene compounds comprising such resins for the manufacture of pipes or pipe fittings, and to such fittings themselves.

For many high-density polyethylene (HDPE) applications, polyethylene with enhanced toughness, strength and environmental stress cracking resistance (ESCR) is desirable. In the context of manufacturing of large diameter thick wall pipe, melt strength of the polymer is also desirable. Increased melt strength helps prevent having the polymer material flow downward due to the effects of gravity. Materials that sag produce pipe with thicker pipe walls on the bottom of the pipe and thinner wall distribution on top of the pipe. Pipe industry standards set limits of maximum allowable variation in wall thickness. Thus, use of polymers with high sagging characteristics can result in producing pipes that are not compliant or unable to meet certain standards. An increase of the melt strength of the polymer, and in turn a reduction in sagging, can be accomplished by long chain branching in the polymer. The long branching prevents the material from sagging as the material exits the pipe extruder, before it enters the vacuum cooling tank.

The present disclosure is also directed to compositions with good resistance to sagging. The disclosure is also directed to composition suitable to applications in which higher low shear melt strength of the polymer melt would be beneficial including blow molding, extruded sheet and film applications. In one embodiment the compositions of the present disclosure are used for the manufacture of pipes and fittings. Polyethylene resins are known for the production of pipes and fittings. Pipe resins require high stiffness (creep rupture strength), combined with a high resistance against slow crack growth as well as resistance to rapid crack propagation yielding impact toughness. Polyethylene pipes are widely used as they are lightweight and can be easily assembled by fusion welding. Polyethylene pipes also have a good flexibility and impact resistance, and they are corrosion free. Unless they are reinforced, however, they are limited in their hydrostatic resistance by the inherent low yield strength of polyethylene. It is generally accepted that the higher the density of the polyethylene, the higher will be the long-term hydrostatic strength. ISO 9080, ISO 12162, ASTM D883 and ASTM D3350 describe the classifications of pipes according to the PE100 and PE4710 specifications.

One requirement for such pipes is to have very good long-term strength as measured by the "Minimum Required Strength" (MRS) rating. Extrapolation according to ISO 9080 shows that they have an extrapolated 20° C./50 years stress at a lower prediction level (97.5% confidence level—"LPL") of at least 8 and 10 MPa; such resins have an MRS rating of MRS 8 or MRS 10 and are known as PE80 and PE100 resins respectively. Another requirement for such pipes is to have very good long-term strength as represented by the Hydrostatic Design Basis (HDB). Extrapolation according to ASTM D2837 shows that they have a 23° C./100,000 hour intercept of at least 1530 psi. Such resins would have an HDB rating of 1600 psi and are known as PE3608 or PE4710 resins depending on other short-term material characteristics such as density and stress crack resistance. In one embodiment, the present disclosure is directed to pipes manufactured with the polyethylene compositions and resins of the present disclosure. In one embodiment, the pipes made with the compositions and resins of the present disclosure meet PE 100 specifications. In one embodiment, pipes made with the composition and resins of the present disclosure meet PE 4710 specifications. These are polyethylene resins which when used for the formation of pipes of specific dimensions, survive a long-term pressure test at different temperatures for a period of 10,000 hours. The density of the current basic powder used in the production of a PE100 or PE4710 compound ranges from about 0.945 g/cm$^3$ to about 0.955 g/cm$^3$, preferably from about 0.947 to 0.951 g/cm$^3$, and preferably is about 949 g/cm$^3$. In certain embodiment, the polyethylene resins contain conventional amounts of black pigments and exhibit densities ranging from about 0.958 to about 0.961 g/cm$^3$.

In one embodiment, the present disclosure is also directed to polymer compositions with good resistance to sagging. In one embodiment, the compositions and resins of the present disclosure could be used for applications where melt strength of high-density polyethylene is important, including blow molding, extruded sheet, and film applications. In another embodiment, this disclosure is also directed to pipes manufactured with the polyethylene composition and resin of the present disclosure and having a diameter greater than 24 inches and a wall thickness greater than 2¼ inches. Large diameter thick pipes generally require high-density polyethylene (HDPE) with high melt strength. High melt strength polymer can be provided by the long chain branching in the polymer that prevents the material from sagging as the material exits the pipe extruder, before it enters the vacuum cooling tank. High-density polyethylene resins with poor melt strength sag, begin to flow downward due to the effects of gravity, producing pipe with non-uniform wall distributions. Materials that sag produce pipe with thicker pipe walls on the bottom of the pipe and thinner wall distribution on top of the pipe. Pipe industry standards set limits of maximum allowable variation in wall thickness. Low sag behavior for most pipe extrusion applications can be predicted by a material's complex viscosity measured at a frequency of 0.01 rad/s at a temperature of 190° C. ($\eta^*_{0.01}$). Examples of pipes with low sag behaviour, but poor mechanical properties have been discussed in the art WO 08006487, EP-1137707 and EP-B-1655333. The compositions of the present disclosure exhibit excellent mechanical properties such as stress crack resistance, creep resistance and resistance to rapid crack propagation.

In another embodiment, the present disclosure is related to a large diameter pipe exhibiting excellent eccentricity, or a low wall thickness spread or variation. Eccentricity or wall thickness spread (or range), which is reported as a percent, may also be referred to as wall thickness variation in the industry. During the cooling cycle of production, the polymer compositions and resins may be pulled towards the bottom of the pipe by gravity. Without correction, the resulting pipe will have greater wall thickness towards the bottom of the pipe and less wall thickness towards the top of the pipe. The variability of the wall thickness throughout the pipe, particularly towards the bottom of the pipe, will lead to a large wall thickness range (i.e., wall thickness spread or variation). The average wall thickness is the average of all wall thickness values measured in accordance with industry standard ASTM D2122-16. The wall thickness range, E, is calculated by the following equation:

$$E = \frac{A-B}{A} 100$$

Where A is the maximum wall thickness measured at any cross section and B is the minimum wall thickness measured at any cross section. The wall thickness range, E, is reported as a percent. According to industry standards ASTM F714-13 and ASTM D3035-15, the wall thickness range (i.e., wall thickness spread or variation) shall not exceed 12%. Pipe producers can adjust the die to get the intended pipe diameter or reduce production output, which minimizes the effect of gravity. Thus, it was known in the industry that an inverse relationship exists between the wall thickness variation and the production output. A higher production output can be achieved at the detriment of cooling limitations and therefore wall thickness variation. Similarly, a reduction in wall thickness variation can be achieved by reducing production output and increasing cooling, and therefore at an economic cost. The compositions of the present disclosure, however, unexpectedly achieve a low wall thickness variation with a high production output value. The reduction in wall thickness variation while increasing production output is unexpected based on what is known in the art. The compositions according to the present disclosure allow for an increased production output without sacrificing wall thickness variation.

In another embodiment, the present disclosure is related to pipe having very high environmental stress crack resistance (PE100-RC). Pipe with these characteristics is suitable for pipe laying techniques such as sandless installations, or when the pipe is in contact with aggressive mediums such as detergents. For example, the German PAS1075 (Public Application Scheme for sandless pipe installation) requires the following properties for pipes to be labelled PE100-RC (for Resistant to Cracks): FNCT>8 760 h at 80° C. under 4 MPa in 2% Arkopal N100, Point loading test>8 760 h at 80° C. under 4 MPa in 2% Arkopal N100, and NPT>8 760 h at 80° C. [176° F.], 9.2 bar. The compositions of the present disclosure fulfil the requirements for the PE100-RC classification. Pipes with good mechanical properties are known in the art, for example in WO 08006487, and EP-1985660.

In one embodiment of the present disclosure, reticulation is used to improve the melt strength of the polymer compositions while retaining good processability and good mechanical properties. In one embodiment, reticulation of the polymer with the addition of peroxide is used to achieve the properties of the present composition. Methods for increasing the melt strength of HDPE compositions by the use of thermally decomposable initiators such as peroxides have been discussed in the art. U.S. Pat. No. 4,390,666, WO 08/006487, WO 9747682, WO 2011/090846, U.S. Pat. No. 4,390,666, WO 2008/083276, WO 2009/091730, U.S. Patent Publication No. 2007/0048472, WO 2006/036348, EP1969018, U.S. Patent Publication No. 2008/0161526 and U.S. Publication No. 2011/0174413. In one aspect, the present disclosure is also directed to processes and methods to manufacture a bimodal high-density polyethylene pipe resin with improved melt-strength while maintaining processability and retaining the properties characteristic of PE 100 and USPE 4710 materials.

Processability of a polymer composition can be characterized by its viscosity at a given shear stress that would be experienced during pipe extrusion. This processability can be predicted by viscosity measurements such as complex viscosity at 100 rad/s) ($\eta^*_{100}$) for pipe extrusion and/or a melt index test such as HLMI. Processability for most pipe extrusion applications can be predicted by a material's complex viscosity measured at a frequency of 100 rad/s at a temperature of 190° C. The processability can be directly measured on pipe extrusion equipment by output, and amperage load required to produce a given pipe size.

The complex viscosity at 100 rad/s ($\eta^*_{100}$) most closely represents the shear rate imparted on the material during pipe extrusion. Viscosity is predictive of processability, i.e. extrusion energy demand and ultimately output. Within the context of the present disclosure, the complex viscosity at 100 rad/s ($\eta^*_{100}$) may also be referred to as the processability viscosity. A polymer composition with a lower processability viscosity value would be easier to process, or it would require less energy or amperage to achieve the same output (lbs/hour), when compared to a composition with a high processability viscosity value. If a material's processability viscosity is too high, or the material is too viscous, the energy required to achieve a desired output rate may be outside of the capability of the extrusion equipment. In this case the total output for that resin would be the limiting factor, and extrusion rates would have to be decreased until the energy demand of the line is within the equipment's capability. For pipe extrusion resins, resins with good processability are generally expected to have a complex viscosity at 100 rad/s ranging from about 1,900 to about 2,600 Pa·s. In one embodiment, the processability is measured by a shear thinning index at 2.7 kPa and 210 kPa from about 60 to about 115, a complex viscosity at 100 rad/s ranging from about 1,900 Pa·s to 2,600 Pa·s, and a high load melt index (HLMI) ranging from about 6 to 11 g/10 min.

In a first aspect, the present disclosure provides a bimodal high-density polyethylene polymer composition comprising a base resin which has a density of about 945 kg/m$^3$ to about 955 kg/m$^3$, preferably 946 kg/m$^3$ to 951 kg/m$^3$, most preferably 947 kg/m$^3$ to 951 kg/m$^3$, and comprises an ethylene polymer (A) having a density of at least 968 kg/m$^3$, preferably above 970 kg/m$^3$, most preferably above 971 kg/m$^3$ in an amount ranging from about 45 to about 55% by weight, preferably from about 47 to about 53% by weight, preferably from about 48 to about 52% by weight, most preferably from about 49.5 to about 51.5% by weight, and an ethylene polymer (B) having a density lower than the density of polymer A, wherein said composition has a complex viscosity at a shear rate of 0.01 rad/s ranging from about 200 to about 450 kPa·s, preferably from about 220 to about 450 kPa·s, most preferably from about 220 to about 420 kPa·s and a complex viscosity at a shear rate of 100 rad/s ranging from about 1900 Pa·s to about 2600 Pa·s, preferably from about 2000 to about 2500 Pa·s, most preferably from about 2100 to about 2450 Pa·s.

The melt index MI$_5$ of the polyethylene composition is preferably from about 0.1 to about 0.5 g/10 min, preferably from 0.20 to 0.45 g/10 min, most preferably from 0.2-0.4 g/10 min. For the purposes of the present disclosure, melt flow indices HLMI, MI$_5$ and MI$_2$ are measured according to ISO1133 at a temperature of 190° C. under loads of 21.6 kg, 5 kg and 2.16 kg respectively.

The shear thinning index SHI is the ratio of the viscosity of the polyethylene composition at different shear stresses. In the present disclosure, the shear stresses at 2.7 kPa and 210 kPa are used for calculating the $SHI_{2.7/210}$ which may be considered as a measure of the broadness of the molecular weight distribution. The $SHI_{2.7/210}$ of the composition preferably ranges from about 60 to about 115, preferably from about 65 to 105, most preferably from about 75 to 95.

The composition preferably has a G'(G"=3000) (Pa) ranging from about 1600 to about 2500, preferably from about 1650 to about 2400, most preferably from about 1700 to about 2200.

The composition preferably has a complex viscosity at a constant shear stress of 747 Pa ($\eta^*_{747}$) preferably from about 400 kPa·s to about 1300 kPa·s, preferably from 500 to 900 kPa·s, and most preferably from 550 to 900 kPa·s. In one embodiment, the composition has a $\eta^*_{747}$ viscosity ranging from about 650 to about 900 kPa·s.

The composition preferably has a zero shear viscosity ($\eta^*_0$) preferably greater than about 500 kPa·s, preferably greater than 650 kPa·s, and most preferably greater than 800 kPa·s. In one embodiment, the composition has a $\eta^*_0$ viscosity ranging from about 800 to about 1,200 kPa·s.

The base resin may optionally further comprise a small prepolymerization fraction in an amount of 5% or less based on total polyethylene. Alternatively or additionally it may further comprise a fraction of very high molecular weight polymer, having a weight average molecular weight higher than the weight average molecular weight components (A), (B) or the prepolymer, in an amount of 5 wt % or less based on total polyethylene.

It is generally preferred that the ratio of polymer (A) to polymer (B) in the base resin is between 45:55 and 55:45, more preferably between 47:53 and 53:47, and most preferably between 48:52 and 52:48, regardless of the presence or otherwise of any additional polyethylene fractions.

The form of the molecular weight distribution curve, i.e. the appearance of the graph of the polymer weight fraction as function of its molecular weight, of a multimodal polyethylene such as the base resin will show two or more maxima or at least be distinctly broadened in comparison with the curves for the individual fractions. For example, if a polymer is produced in a sequential multistage process utilising reactors coupled in series with different conditions in each reactor, each of the polymer fractions produced in the different reactors will have its own molecular weight distribution and weight average molecular weight. The molecular weight distribution curve of such a polymer comprises the sum of the individual curves of the fractions, typically yielding a curve for the multimodal polymer having a substantially single peak or two or more distinct maxima. A "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in a molecular weight distribution curve into two or more components by various methods.

It is particularly preferred that ethylene polymer (A) is a homopolymer, and the ethylene polymer (B) is a copolymer of ethylene and a $C_4$-$C_8$ alpha-olefin.

As used within this disclosure, the term "homopolymer" is understood to denote an ethylene polymer composed essentially of monomer units derived from ethylene and substantially devoid of monomer units derived from other olefins, which corresponds to a comonomer content of less than about 0.15 mol %. The term "copolymer of ethylene and a $C_4$-$C_8$ alpha-olefin" is understood to denote a copolymer comprising monomer units derived from ethylene and monomer units derived from a $C_4$-$C_8$ alpha-olefin and, optionally, from at least one other .alpha.-olefin. The $C_4$-$C_8$ alpha-olefin can be selected from olefinically unsaturated monomers comprising from 4 to 8 carbon atoms, such as, for example, 1-butene, 1-pentene, 1-hexene, 3-methyl-1-butene, 3- and 4-methyl-1-pentenes and 1-octene. Preferred alpha-olefins are 1-butene, 1-hexene and 1-octene and more particularly 1-hexene. More preferred comonomers are $C_6$-$C_8$ alpha-olefin, the most preferred comonomer is 1-hexene.

The other alpha-olefin which may also be present additional to the $C_4$-$C_8$ alpha-olefin is preferably selected from olefinically unsaturated monomers comprising from 3 to 8 carbon atoms, such as, for example, propylene, 1-butene, 1-pentene, 3-methyl-1-butene, 3- and 4-methyl-1-pentenes, 1-hexene and 1-octene.

The content in the composition of monomer units derived from $C_4$-$C_8$ alpha-olefin, hereinafter called comonomer content is preferably from about 0.3 to 0.65 mol %, preferably from about 0.4 to 0.65 mol %, and most preferably from about 0.4 to 0.6 mol %. The content in copolymer (B) of monomer units derived from $C_4$-$C_8$ alpha-olefin is generally at least 0.6 mol %, in particular at least 0.8 mol %. The comonomer content of copolymer (B) is usually at most 1.5 mol %, preferably at most 1.1 mol %.

In one embodiment of the present disclosure, polymer (A) has an $MI_2$ ranging from about 200 to 600. In one embodiment of the present disclosure polymer (A) has an $MI_2$ ranging from about 300 to 500 g/10 min. In one embodiment, the density of polymer (A) preferably ranges from about 968 kg/m³ to 975 kg/m³. The density of polymer (A) more preferably ranges from about 970 kg/m³ to 974 kg/m³, and from 971 to 974 kg/m³. The density of copolymer (B) preferably ranges from about 915 kg/m³ to 935 kg/m³, and from about 920 kg/m³ to about 930 kg/m³.

If polymers (A) and (B) are made separately and then blended, it is possible to measure directly the melt index, density and comonomer content of both polymers. However, if the multimodal polymer is made in a multistage process in which one polymer is made prior to the other and then the second polymer is made in the presence of the first polymer, the melt index, density and comonomer content of the second polymer cannot be measured, and instead for the purposes of this disclosure they are defined as follows:

The melt index of the second polymer is defined as that measured for the second polymer when made separately under the same polymerization conditions as used to make the multimodal base resin. In other words, the second polymer is made separately using the same catalyst and under the same polymerization conditions as those employed in the second reactor of the multimodal polymerization, and its melt index is then measured. The density of the second polymer is defined as being that calculated from the relationship: density (resin)=wt %(1)*density(1)+ wt %(2)*density(2) where (1) and (2) are respectively the first and second polymers.

The comonomer content of the second polymer is defined as being that calculated from the relationship: comonomer content (resin)=wt %(1)*comonomer content (1)+wt %(2) *comonomer content (2) where (1) and (2) are respectively the first and second polymers.

If the multimodal polymer is made with a "multiple catalyst system" such as a bimetallic catalyst, it is possible to make both polymers (A) and (B) in the same reactor. In such a case it is not possible to measure directly the properties of either polymer (A) or polymer (B). Therefore in this case the properties of both polymers (A) and (B) are defined as being those obtained when the respective polymers are prepared separately using the individual catalysts of the "multiple catalyst system", and under the same polymerization conditions as those employed for making the multimodal polymer.

In one embodiment, the multimodal composition of the present disclosure comprises a base resin having a density ranging from about 947 to about 951 kg/m$^3$, and comprising an ethylene polymer (A) having a density of at least 971 kg/m$^3$ in an amount ranging from about 48 to about 52 wt %, an ethylene polymer (B) having a density of about 920 to about 930 kg/m$^3$ in an amount ranging from about 52 to about 48 wt %, and said composition having a comonomer content of ranging from about 0.30 to about 0.65 mol % a G'(G"=3000) (Pa) between 1700 and 2200 Pa., a complex viscosity at a shear rate of 100 rad/sec ranging from about 2100 to about 2450 Pa·s, a complex viscosity at a shear rate of 0.01 rad/s ranging from about 220 to about 420 kPa·s.

In other embodiments, the polymer compositions may comprise additional components without departing from the scope of the present disclosure. In particular, the composition may contain conventional additives in an amount of up to about 10 wt %, preferably up to about 5 wt % and more preferably up to about 3 wt % based on the total weight of the composition. Such additives include stabilizers (antioxidizing agents and/or anti-UV agents), antistatic agents and processing aids, as well as pigments. The composition may also contain up to 10 wt % of another polyolefin, preferably another polyethylene.

As used in the present disclosure, "multiple catalyst system" refers to a composition, mixture or system including at least two different catalyst compounds, each having the same or a different metal group, including a "dual catalyst," e.g., a bimetallic catalyst. Use of a multiple catalyst system enables the multimodal product to be made in a single reactor. Each different catalyst compound of the multiple catalyst system may reside on a single support particle, in which case a dual (bimetallic) catalyst is considered to be a supported catalyst. However, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the bimetallic catalyst system, i.e., the two collections of supported catalysts. Alternatively, the multiple catalyst system includes a mixture of unsupported catalysts in slurry or solution form.

In one embodiment according to the present disclosure, the multimodal polyethylene base resin is preferably obtained by a multistage ethylene polymerization, typically using a series of reactors. A multistage process is a polymerization process in which a polymer comprising two or more fractions is produced by producing at least two polymer fraction(s) in separate reaction stages, usually with different reaction conditions in each stage, in the presence of the reaction product of the previous stage. The polymerization reactions used in each stage may involve conventional ethylene homopolymerization or copolymerization reactions, e.g. gas-phase, slurry phase, liquid phase polymerizations, using conventional reactors, e.g. loop reactors, gas phase reactors, batch reactors etc.

It is preferred that the polymer (A) is produced in the first reactor, and that polymer (B) is produced in a subsequent reactor. This order, however, may be reversed. If the base resin includes a prepolymer, this is made in a reactor preceding the first reactor. It is preferred that all reactors are slurry reactors, in particular slurry loop reactors. In one embodiment, the preferred multistage polymerization process includes in a first reactor, ethylene is polymerized in slurry in a first mixture comprising a diluent, hydrogen, a catalyst based on a transition metal and a cocatalyst, so as to form from 30 to 70% by weight with respect to the total weight of the composition of an ethylene homopolymer (A); said first mixture is withdrawn from said reactor and is subjected to a reduction in pressure, so as to degas at least a portion of the hydrogen to form an at least partially degassed mixture, and said at least partially degassed mixture, together with ethylene and a $C_4$-$C_8$ alpha-olefin and, optionally, at least one other alpha.-olefin, are introduced into a subsequent reactor and the slurry polymerization is carried out therein in order to form from 30 to 70% by weight, with respect to the total weight of the composition, of a copolymer of ethylene and of $C_4$-$C_8$ alpha-olefin.

In one embodiment, a low-molecular weight (LMW) ethylene polymer component (A) is made in a first reactor and a high-molecular weight (HMW) ethylene polymer component (B) is added in a second reactor. Within the context of this disclosure the terms "LMW ethylene polymer component (A)", "ethylene polymer component (A)" or "LMW ethylene component" may be used interchangeably. Similarly, within the context of this disclosure the terms "HMW ethylene polymer component (B)", "ethylene polymer component (B)" or "HMW ethylene component" may also be used interchangeably. The mass ratio of LMW ethylene polymer component (A) to the final bimodal HDPE polymer is in an amount ranging from 45% to 55% by weight, preferably from 47 to 53% by weight, preferably from 48 to 52% by weight, and most preferably from 49.5 to 51.5% by weight. In one embodiment, the polymerization occurs in both reactors in the presence of hydrogen, and the ratio of molar hydrogen concentration in the first reactor to molar hydrogen concentration in the second reactor is from 250:1 to 350:1.

The disclosure also provides a process for obtaining a pipe or a pipe fitting, comprising the steps of polymerising ethylene and optionally comonomer, compounding the polyethylene composition, and then extruding or injection moulding the composition to form an article. In most embodiments according to the present disclosure, the step of polymerising ethylene preferably forms a multimodal polyethylene.

The catalyst employed in the polymerization process to produce the polyethylene base resins used in the compositions of the disclosure may be any catalyst(s) suitable for preparing such polyethylenes. If the polyethylene is bimodal, it is preferred that the same catalyst produces both the high and low molecular weight fractions. For example, the catalyst may be a Ziegler-Natta catalyst or a metallocene catalyst. Preferably the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilized. Good results have been obtained with catalysts comprising: from 5 to 30%, preferably from 6 to 22%, most preferably 8 to 18% by weight of transition metal, from 0.5 to 20%, preferably from 2 to 18%, most preferably 4 to 15% by weight of magnesium, from 20 to 70%, preferably from 30 to 65%, most preferably 40 to 60% by weight of halogen, such as chlorine, from 0.1 to 10%, preferably from 0.2 to 8%, most preferably 0.5 to 5% by weight of aluminum; the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminium composition. Such catalysts have been described in U.S. Pat. Nos. 3,901,863; 4,292,200 and 4,617,360. The catalyst is preferably introduced only into the first polymerization reactor, i.e. there is no introduction of fresh catalyst into the further polymerization reactor. The amount of catalyst introduced into the first reactor is generally adjusted to obtain an amount of at least 0.5 mg of transition metal per liter of diluent. The amount of catalyst usually does not exceed 100 mg of transition metal per liter of diluent.

In one embodiment, a preferred catalysts contain 8 to 18% by weight of transition metal, 4 to 15% by weight of magnesium, 40 to 60% by weight of chlorine and 0.5 to 5% by weight of aluminum, and have a residual organic radical content in the precipitated catalyst of less than 35 wt %. These catalysts are also obtained by coprecipitation of at least one transition metal compound and a magnesium compound by means of a halogenated organoaluminium compound, but with a ratio of transition metal to magnesium of no more than about 1:1. For additional discussion in these catalyst see EP-B-2021385 which is incorporated herein in its entirety.

A preferred catalytic system for use in the process of the present disclosure comprises a catalytic solid comprising magnesium, at least one transition metal selected from the group consisting of titanium and zirconium and halogen, prepared by successively reacting, in a first step (i) at least one magnesium compound (M) chosen from oxygen-containing organic magnesium compounds with at least one compound (T) selected from the group consisting of oxygen-containing organic tetravalent titanium and zirconium compounds, until a liquid complex is obtained; treating, in a second step, the complex obtained in the first step with a halogen-containing aluminic compound of formula ALRnX3−n, in which R is a hydrocarbon radical comprising up to 20 carbon atoms, X is a halogen and n is less than 3, and an organometallic compound of a metal chosen from lithium, magnesium, zinc, aluminum or tin.

The preparation of the solid catalytic complex comprises the step (ii), the main function of which is to reduce the valency of the transition metal and simultaneously additionally halogenate, if necessary, the magnesium compound and/or the transition metal compound: thus most of the alkoxy groups still present in the magnesium compound and/or in the transition metal compound are substituted by halogens, such that the liquid complex obtained after step (i) is transformed in a catalytically active solid. The reduction and possible further halogenation are performed simultaneously using the halogen-containing aluminic compound which thus acts as a reductive halogenating agent. The treatment using the halogen-containing aluminic compound in step (ii) of the preparation of the catalytic solid may be carried out by any suitable known means, and preferably by gradually adding the halogen-containing organoaluminium compound to the liquid complex obtained in step (i). The temperature at which step (ii) is performed should not exceed 60° C., temperatures of no more than 50° C. being the most advantageous. The preferred temperature range is 25-50° C., with the most preferable range being 30-50° C. The cocatalyst utilized in the process is preferably an organoaluminium compound. Unhalogenated organoaluminium compounds of formula $AlR_3$ in which R represents an alkyl grouping having from 1 to 8 carbon atoms are preferred. In one embodiment, triethylaluminium and tri-isobutylaluminium are preferred.

In one embodiment, the multistage polymerization process described above for producing the composition of the disclosure utilizes a Ziegler-Natta catalyst. In such a case the polymerization temperature is generally from 20 to 130° C., preferably at least 60° C., and generally it does not exceed 115° C. The total pressure at which the process is affected is in general from 0.1 MPa to 10 MPa. In the first polymerization reactor, the total pressure is preferably at least 2.5 MPa. Preferably, it does not exceed 5 MPa. In the further polymerization reactor, the total pressure is preferably at least 1.3 MPa. Preferably, it does not exceed 4.3 MPa.

The period of polymerization in the first reactor and in the further reactor is in general at least 20 minutes, preferably at least 30 minutes. The period of polymerization generally does not exceed 5 hours, and preferably it does not exceed 3 hours. In this process, a slurry comprising the resin of the disclosure is collected at the outlet of the further polymerization reactor. The composition may be separated from the suspension by any known means. Usually, the suspension is subjected to a pressure expansion (final expansion) to eliminate the diluent, the ethylene, the alpha-olefin and any hydrogen from the composition.

In one embodiment, the material modified by a decomposable thermal initiators such as a peroxide according to the present disclosure can be used in the production of thick wall pipe within those industry standards, while still meeting or exceeding PE100 and PE4710 standards, and while maintaining good processability.

In one embodiment, polymer compositions according to the present disclosure are reticulated, usually in a post-production compounding step. The polymer composition can be reticulated using a decomposable thermal initiator. The bimodal resin flake produced on the reactor or reactors acts as the base material to be modified. This material is fed to the extrusion equipment along with the additive package and the decomposable thermal initiators. The extrusion equipment melts the HDPE flake and disperses the additives and the decomposable thermal initiators. Consistency of polymer and additive feed determines how well the polymer/additive/decomposable thermal initiators mixture is dispersed. The temperature and residence time in the mixing and extruder cause the decomposable thermal initiators to react with the base polymer.

In one embodiment, cross-linking of the polymer is done using decomposable thermal initiators. The cross-linking of the polymer is controlled by addition of the initiator in powder or liquid form in the pre-mix of additives fed in the extruder, simultaneously with polyethylene powder. The decomposable thermal initiator may be added as a neat compound or may alternatively be dispersed in another polymer as a masterbatch, typically polyethylene or polypropylene. The type of initiator is selected according to its half time life curve versus temperature Decomposable thermal initiators are known in the art, such as azobisisobutyronitrile (AIBN), peroxy compound such as diacyl peroxides, acetyl alkyl sulfonyl peroxides, dialkyl peroxydicarbonates, tert-alkylperoxyesters, OO-tert-alkyl O-alkyl monoperoxycarbonates, di(tert-alkylperoxy)

ketals, di(tert-alkyl)peroxides, tert-alkyl hydroperoxides, and ketone peroxides, redox initiators, and the like.

In one embodiment, preferred peroxy compounds comprise diacylperoxides such as dibenzoyl peroxide BPO, di(2,4-dichlorobenzoyl) peroxide, diacetyl peroxide, dilauroyl peroxide, didecanoyl peroxide, diisononanoyl peroxide and succinic acid peroxide; peroxy esters such as di-tert-butyl diperoxyphthalate, tert-butyl perbenzoate, tert-butyl peracetate, tert-amyl perbenzoate, 2,5-di(benzoylperoxy)-2,5-dimethylliexane, tert-butyl peroxymaleic acid, tert-butyl peroxyisobutyrate, tert-butyl peroxy-2-ethylhexanoate(tert-butyl peroctoate), tert-amyl peroctoate, 2,5-di(2-ethylhexanoylperoxy)-2,5-dimethyl-hexane, tert-butyl peroxypivalate, tert-amyl peroxypivalate, tert-butyl peroxyneodecanoate, tert-amyl peroxyneodecanoate, a-cumyl peroxyneodecanoate; diperoxyketals, such as ethyl-3,3-di(tert.butylperoxy)butyrate, ethyl 3,3-di(tert-amyiperoxy)-butyrate, n-butyl 4,4,-di(tert-butylperoxy)valerate, 2,2-di(tert-butylperoxy)butane, 1,1-di(tert-butylperoxy)cyclohexane, 1,1-di(tert-butylperoxy)-3,3,5-trimethylcyclohexane, and 1,1-di(tert-amylperoxy)cyclohexane; dialkylperoxides, such as 2,5(tert-butylperoxy)-2 5-dimethyl-3-hexyne, di-tert-butyl peroxide, tert-butyl-acumyl peroxide, 2,5-di(tert-butylperoxy)-2,5-dimethylhexane, a-a'-di(tert-butyl-peroxy)-1,3- and 1,4-diisopropylbenzene, and dicumylperoxide; peroxydicarbonates such as di-n-propyl peroxydicarbonate, diisopropyl peroxycarbonate, dicetyl peroxydicarbonate, di-sec-butyl peroxydicarbonate, di(2-ethylhexyl)peroxy dicarbonate, and di(4-ter(-butylcyclohexyl)peroxydicarbonate; and tert-alkylhydro peroxides such as tert-butyl hydroperoxide, tert-amyl hydroperoxide, cumene hydroperoxide, 2,5-dihydroxyperoxy-2,5-dimethylhexane, pinane hydroperoxide, para-menthane hydroperoxide, and diisopropylbenzene hydroperoxide.

In some embodiments of the present disclosure peroxy initiators are selected from: 2,5-dimethyl-2,5-di(tert-butylperoxy)hexyne-3; 2,5-dimethyl-2,5-di(tert-butylperoxy)hexane; di-tert-butyl peroxide; 1,3-1,4-di-tert-butylperoxyisopropyl benzene; tert-butylcumylperoxide; dicumylperoxide; 3,3,6,6,9,9-hexamethyl-1,2,4,5-tetracyclononane; 4,4-di-tert-butyl peroxy-n-butylvalerate; 1,1-di-tert-butyl peroxycyclohexane; tert-butyl peroxybenzoate; dibenzoyl peroxide; di(2,4-dichlorobenzoyl)peroxide; di(p-chlorobenzoyl) peroxide; 2,2-di (tert-butylperoxy)butane; ethyl-3,3-bis(tert-butylperoxy) butyrate. In one embodiment, the compositions and resins according to the present disclosure are treated with 2,5-dimethyl-2,5-di(tert-butylperoxy)hexane and bis(tert-butylperoxyisopropyl)benzene.

In a preferred embodiment of the present disclosure the polymer is treated with 2,5-dimethyl-2,5-di(tert-butylperoxy)hexane, commercially available under the names Trigonox 101 and Pergaprop Hx 7,5 PP, adhered to a PP flake surface at a 7.5 wt % concentration. In some embodiments, the amount of neat peroxy initiator used in the cross-linking process ranges from about 50 ppm to about 150 ppm by weight, and preferably from about 50 ppm to about 100 ppm by weight. Preferably the amount of peroxide is sufficient to ensure that the resulting polyethylene composition has the desired complex viscosity at low shear rate ($\eta^*_{0.01}$). The amount of peroxy initiator required to obtain the desired value depends partly on the melt strength of the original unreticulated polyethylene as well as on the type of peroxide used and on the compounding conditions, more specifically the melt temperature and extruder residence time as these factors will influence the reticulation efficiency.

The optimal peroxide loading level will vary based on the material's starting melt strength and the type of organic peroxide used. Materials with low shear viscosities lower than 200,000 Pa·s generally do not to have the melt strength capable of producing thick wall pipe with wall distributions within industry specifications. In one embodiment, the load of peroxide is controlled to obtain material which exhibits low shear viscosities at 0.01 rad/s no greater than about 450,000 Pa·s. In one embodiment, the preferred amount of peroxide used is below 150 by weight. It is possible to produce thick wall pipe with materials that have low shear viscosities greater than 450,000 Pa·s, but the increased low shear viscosity of the material would not produce additional advantage, the use of additional peroxide may become cost prohibitive, cause end product processing issues (such as decrease in output and undesirable surface imperfections), and could cause physical property degradation. Examples of possible processing issues associated with use of higher levels of peroxide include the presence of excess gels in the material, causing rough surfaces and weak spots in the pipe that could lead to early pipe failures under pressure.

The polyethylene powder produced in a polymerization process such as that disclosed above is fed to the extrusion equipment along with the additive package and the peroxide. The extrusion equipment melts the powder and disperses any additives and the peroxide. The peroxide must be well dispersed within the polymer melt, at temperatures hot enough and residence times long enough to fully initiate the peroxide and allow the consequent radical chain reactions to occur to a sufficient extent to produce the desired effect. The peroxide must be well dispersed within the polymer melt, at temperatures hot enough and residence times long enough to fully initiate the peroxide and allow the consequent radical chain reactions to occur to a sufficient extent to produce the desired effect of increased melt strength and retained processability. The additive feeding hardware must be able to feed a consistent amount of peroxide, to give a consistent (homogeneous) modified product.

If a peroxide carrier with a particle size more similar to the other additives that are being added to the HDPE melt could be used, the additives could all be combined into a larger tote bin, allowing the additive feeder to feed at higher rates with less variability to produce better control of organic peroxide addition rates. The type of peroxide used and the carrier used to transport the peroxide also could be changed (liquid, PP flake, HDPE flake). The organic peroxide and its carrier could be replaced with functional alternatives. If available, a HDPE flake or pellet could be used as a carrier for the peroxide, a neat liquid peroxide could be used, as well as other forms of the desired peroxide. Other organic peroxides that could be used include dicumyl peroxide, tert-butylcumyl peroxide, 1,3-1,4Bis(tert-butylperoxyisopropyl)benzene, and 2,5 Dimethyl 2,5 Di(tert-butylperoxyl) hexyne, and others. Such replacement materials, while not changing the basic disclosure, would result in the possible need for a re-calculation in target peroxide concentrations and other reactive extrusion conditions, such as residence time needed to achieve proper mixing.

Tighter controls and better peroxide addition methods may improve the properties of the compositions according to the present disclosure. Extrusion temperature and residence time allow the peroxide to fully react once added to the base resin flake. Temperatures must be high enough and the peroxide must remain in contact with the polymer for long enough for the long chain branching to occur. The peroxide used can be added as either a solid or a liquid.

The extrusion equipment could also be replaced or altered to use many different types of commercially available polymer extrusion equipment. The extrusion equipment used must be capable of providing sufficient heating, residence time, and shear (work) being imparted on the polymer.

If the extrusion temperature is too high, the peroxide could be consumed before being able to be well dispersed in the polymer matrix, especially if it were to come in contact with a hot surface before being mixed with the polymer. The peroxide reaction would begin, but not react with the polymer chains. The desired melt strength increase would not be achieved in the polymer. If this were to occur, reduced long chain branching would occur and the low shear viscosity of the bulk HDPE material would not be sufficient. Extrusion temperatures may impact the reticulation process. In one embodiment, the reticulation according to the present disclosure is carried at a temperature lower than about 320° C. In one embodiment, the reticulation according to the present disclosure is carried at a temperature lower than about 280° C. (550° F.). The minimum residence time at a certain temperature depends on the half-life of the peroxide at that temperature. The half-life at a given temperature will vary with type of peroxide used.

Compositions made according to some embodiments of the present disclosure can be mixed with the usual processing additives for polyolefins, such as stabilizers (antioxidizing agents and/or anti-UV agents), antistatic agents and processing aids, as well as pigments.

Pipes made from the compositions according to some embodiments of the disclosure preferably have one or more of the following properties an MRS 10 rating or better as defined by standard ISO/TR 9080 or a PE4710 listing per ASTM D883 and ASTM D3350.

In some embodiments, the pipes made from the compositions described above may be used in potable water systems or in other applications where water may be chlorinated or disinfected. The continuous presence of disinfectant residuals in water can create an oxidative environment. In some embodiments, pipes that may be used in potable water systems or in other applications where water may be chlorinated or disinfected are designed to have a chlorine resistance in accordance with industry standard described in ASTM D3350-14. ASTM D3350-14 forms the basis of the specification that defines the oxidative resistance classification for materials. The standard test method used to evaluate the oxidative resistance of polyethylene pipe to chlorinated water is described in ASTM F2263-14. Accelerated testing may be conducted in accordance with the modifications described in ASTM D3350-14. A polyethylene pipe meets the requirements for Category 1 classification when the pipe exhibits a stress failure time of greater than 2,700 hours at 360 psi, 1,900 hours at 400 psi, or 1,200 hours at 450 psi, according to ASTM F2263-14. A polyethylene pipe meets the requirements for Category 2 classification when the pipe exhibits a stress failure time of greater than 7,400 hours at 360 psi, 5,100 hours at 400 psi, or 3,400 hours at 450 psi, according to ASTM F2263-14. A polyethylene pipe meets the requirements for Category 3 classification when the pipe exhibits a stress failure time of greater than 16,200 hours at 360 psi, 11,100 hours at 400 psi, or 7,400 hours at 450 psi, according to ASTM F2263-14.

In some embodiments, pipes made from the compositions according to some embodiments meet the requirements for Category 1 classification, Category 2 classification, or Category 3 classification, according to ASTM F2263-14. In some embodiments, pipes made from the compositions according to some embodiments exhibit a stress failure time of greater than 2,700 hours at 360 psi, 1,900 hours at 400 psi, or 1,200 hours at 450 psi, according to ASTM F2263-14. In some embodiments, pipes made from the compositions according to some embodiments exhibit a stress failure time of greater than 7,400 hours at 360 psi, 5,100 hours at 400 psi, or 3,400 hours at 450 psi, according to ASTM F2263-14. In some embodiments, pipes made from the compositions according to some embodiments exhibit a stress failure time of greater than 16,200 hours at 360 psi, 11,100 hours at 400 psi, or 7,400 hours at 450 psi, according to ASTM F2263-14.

Unless otherwise specified, all numbers expressing quantities of ingredients, reaction conditions, and other properties or parameters used in the specification and claims are to be understood as being modified in all instances by the term "about." All numerical ranges herein include all numerical values and ranges of all numerical values within the recited range of numerical values. By way of non-limiting illustration, concrete examples of certain embodiments of the present disclosure are given below.

EXAMPLES

Testing Methods
Melt Index

Melt indexes were determined according to ISO1133 or ASTM D1238 and the results are indicated in g/10 min, but both tests will give substantially the same results. For polyethylenes a temperature of 190° C. is applied. $MI_2$ is determined under a load of 2.16 kg, $MI_5$ is determined under a load of 5 kg and HLMI is determined under a load of 21.6 kg.

Density

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Comonomer Content

The $C_4$-$C_8$ alpha-olefin content was measured by $^{13}C$ NMR according to the method described in J. C. Randall, JMS-Rev. Macromol. Chem. Phys., C29(2&3), p. 201-317 (1989). The content of units derived from $C_4$-$C_8$ alpha-olefin was calculated from the measurements of the integrals of the lines characteristic of that particular $C_4$-$C_8$ alpha-olefin in comparison with the integral of the line characteristic of the units derived from ethylene (30 ppm). A polymer composed essentially of monomer units derived from ethylene and a single $C_4$-$C_8$ alpha-olefin is particularly preferred.

Environmental Stress Crack Resistance (ESCR)

Environmental stress crack resistance (ESCR) was determined by Notched Pipe Test (NPT). The notched pipe test was performed according to ISO 13479: 1997 on a pipe of diameter 110 mm and thickness 10 mm (SDR 11). The test was run at 80° C. at a pressure of 9.2 bar.

Stress Crack Resistance (PENT)

Another method to measure environmental stress crack resistance is the Pennsylvania Notched Tensile Test (PENT), ASTM D1473. PENT is the North American accepted standard by which pipe resins are tested to classify their ESCR performance. A molded plaque was given a specified depth notch with a razor and tested at 80° C. under 2.4 MPa stress to accelerate the stress cracking failure mode of a material. The time in which the specimen fails, breaks completely or elongates over a certain length, was used for its ESCR classification. A PE4710 by definition must not fail before 500 hours. Materials described in this patent tested over 10,000 hours without failure and are considered high performance materials.

Resistance to Rapid Crack Propagation (RCP)

Resistance to rapid propagation of cracks (RCP) was measured according to method S4 described in ISO standard 13477. The critical temperature was determined on a pipe of diameter 110 mm and thickness 10 mm (SDR 11) at a constant pressure of 5 bar. The critical temperature is defined as the lowest crack-arrest temperature above the highest crack propagation temperature; the lower the critical temperature, the better the resistance to rapid crack propagating.

Creep Resistance

Creep resistance was measured according to ISO 1167 on a pipe of diameter 50 mm and thickness 3 mm (SDR17) pipes to determine the lifetime prior to failure at a temperature of 20° C. and 80° C. and a stress of between 5 and 13 MPa.

Melt Rheology at Constant Shear Rate

Dynamic rheological measurements to determine the complex viscosities Was a function of shear rate were carried out, according to ASTM D 4440, on a dynamic rheometer (e.g., ARES), such as a Rheometrics, Ares model 5 rotational rheometer, with 25 mm diameter parallel plates in a dynamic mode under an inert atmosphere. For all experiments, the rheometer was thermally stabilized at 190° C. for at least 30 minutes before inserting the appropriately stabilized (with anti-oxidant additives), compression-molded sample onto the parallel plates. The plates were then closed with a positive normal force registered on the meter to ensure good contact. After about 5 minutes at 190° C., the plates were lightly compressed and the surplus polymer at the circumference of the plates was trimmed. A further 10 minutes was allowed for thermal stability and for the normal force to decrease back to zero. That is, all measurements were carried out after the samples had been equilibrated at 190° C. for about 15 minutes and were run under full nitrogen blanketing.

Two strain sweep (SS) experiments were initially carried out at 190° C. to determine the linear viscoelastic strain that would generate a torque signal which was greater than 10% of the lower scale of the transducer, over the full frequency (e.g. 0.01 to 100 rad/s) range. The first SS experiment was carried out with a low applied frequency of 0.1 rad/s. This test was used to determine the sensitivity of the torque at low frequency. The second SS experiment was carried out with a high applied frequency of 100 rad/s. This was to ensure that the selected applied strain was well within the linear viscoelastic region of the polymer so that the oscillatory rheological measurements do not induce structural changes to the polymer during testing. In addition, a time sweep (TS) experiment was carried out with a low applied frequency of 0.1 rad/s at the selected strain (as determined by the SS experiments) to check the stability of the sample during testing.

The frequency sweep (FS) experiment was then carried out at 190° C. using the above appropriately selected strain level between dynamic frequencies range of $10^{-2}$ to 100 rad/s, under nitrogen. The dynamic rheological data thus measured were then analyzed using the rheometer software (viz., Rheometrics RHIOS V4.4 or Orchestrator Software) to determine the melt elastic modulus G'(G"=3000) at a reference melt viscous modulus (G") value of G"=3000 Pa. If necessary, the values were obtained by interpolation between the available data points using the Rheometrics software.

The term "Storage modulus", G'(w), also known as "elastic modulus", which is a function of the applied oscillating frequency, co, is defined as the stress in phase with the strain in a sinusoidal deformation divided by the strain; while the term "Viscous modulus", G"(co), also known as "loss modulus", which is also a function of the applied oscillating frequency, co, is defined as the stress 90 degrees out of phase with the strain divided by the strain. Both these moduli, and the others linear viscoelastic, dynamic rheological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

Melt Rheology at Constant Shear Stress

The rheological properties of a material at a low shear rates were measured to better understand the material as it sags under gravitation forces. A constant stress test was used to determine the complex viscosity η* at low shear stress. The experiments were conducted using an ARES G2 manufactured by TA Instruments. In this transient experiment, the sample was placed under a low shear stress where the viscosity was no longer shear stress dependent. In this region at very low shear stresses, the shear rate is also expected to be very low, much lower than the complex viscosity measured at 0.01 rad/s, and the viscosity in the region is expected to be shear rate independent. The compliance is a function of shear stress and time and defined as the ratio of time dependent strain over a constant stress. The experiments were conducted at low shear stress values where the creep compliance becomes independent of shear stress and linear with time allowing the determination of zero shear viscosity. The inverse slope of the compliance plot can be defined as the material's zero shear viscosity and can be seen in Table 1. The experiments were carried out at 190° C. under nitrogen using a 25 mm diameter parallel plate. The distance between the parallel plates during the experiment was 1.7 mm±1%. Stress control loop parameters were run and calculated prior to the test using a strain amplitude determined in the linear visco-elastic region. A total time of 6 minutes was used to condition the sample and transducer. A low shear stress of 747 Pa is then applied to the sample and maintained for 1800 seconds. After this time the viscosity of the sample is measured. The zero shear viscosity is determined from the time dependent creep compliance.

Oxidative Resistance

Chlorine resistance testing was performed in accordance with ASTM F2263-14, Standard Test Method for Evaluating the Oxidative Resistance of Polyethylene (PE) Pipe to Chlorinated Water. The testing methodology follows the Jana Mode 3 Shift Functions approach to assess polyethylene compound performance in potable water applications. Experiments were conducted in general accordance with ASTM F2263-14 with the following modifications: (1) at least 6 samples were tested at 90° C.; (2) testing was conducted on 4 foot, DR 11 IPS pipe according to the dimensional requirements of ASTM D3035-15; (3) the flow rate established an average oxidation reduction potential (ORP) of the test fluid above 825 mV; (4) the external test environment was not air or non-chlorinated water; (5) the calculation of the log average time to failure included all failures; (7) if one sample failed due to defective test apparatus, sample preparation, or other anomaly with test procedure, the log average testing time of the remaining 5 samples may have been used to determine categorization; and (8) the sample was categorized according to Table 2 of ASTM D3350-14.

Wall Thickness Variability

Wall thickness variability was measured in accordance with ASTM D2122-16, Standard Test Method for Determining Dimensions of Thermoplastic Pipe and Fittings. Testing was conducted at 23° C. and 10% relative humidity. A cylindrical or ball anvil tubing micrometer was used to make a series of measurements at closely spaced intervals. At least the necessary minimum of eight measurements were taken. The measurements are used to calculate the wall thickness variation (or range), E.

Preparation of Black Composition

The manufacture of a base resin I comprising ethylene polymers was carried out in suspension in isobutane in two loop reactors, connected in series and separated by a device which makes it possible continuously to carry out the reduction in pressure. Isobutane, ethylene, hydrogen, triethylaluminium and the catalyst were continuously introduced into the first loop reactor and the polymerization of ethylene was carried out in this mixture in order to form the homopolymer (A). This mixture, additionally comprising the homopolymer (A), was continuously withdrawn from the said reactor and was subjected to a reduction in pressure, to remove at least a portion of the hydrogen. The resulting mixture, at least partially degassed of hydrogen, was then continuously introduced into a second polymerization reactor, at the same time as ethylene, 1-hexene, isobutane and hydrogen, and the polymerization of the ethylene and of the hexene was carried out therein in order to form the ethylene/1-hexene copolymer (B). The suspension comprising the composition comprising ethylene polymers was continuously withdrawn from the second reactor and this suspension was subjected to a final reduction in pressure, so as to flash the isobutane and the reactants present (ethylene, hexene and hydrogen) and to recover the composition in the form of a dry powder, which was subsequently treated in a purge column in order to remove most of the process components trapped in the polymer particles. Catalysts were used as described in EP-B-2021385. The other polymerization conditions and copolymer properties are presented in Table 1.

Additives were incorporated to the powder particles and subsequently intensively mixed together prior to feeding the compounding equipment, a conventional twin screw extruder. The additives included at least one acid neutralizer like calcium stearate or zinc stearate in an amount between 500 and 2000 ppm or a mixture of both, and at least one process antioxidant like Irgafos 168 in an amount between 500 and 2500 ppm and a at least one thermal antioxidant like Irganox 1010 in an amount between 500 and 2500 ppm. Small quantities of processing aid, such as SOLEF 11010/1001, may also be added. The additives also include Carbon Black in an amount of 2.0-2.4 wt %. A thermal decomposition agent, 2.5-dimethyl-2,5-di(tert-butylperoxy)hexane (DHBP) is optionally incorporated in the feed via a 7.5 wt % master batch in polypropylene.

This mixture of flake/additives/peroxide enters the mixing section of the extruder where the material is heated, melted, and mixed together. The time the material spends in the mixing and extrusion sections is considered the reaction's residence time. The other pelletization conditions and properties of the pelletized resin are specified in Table 2.

TABLE 1

Polymerization conditions and properties for base polymer I

| EXAMPLE | I |
|---|---|
| Reactor 1 | |
| C2 (mol %) | 1.75 |
| H2/C2 (mol/mol %) | 42.1 |
| T (° C.) | 95 |
| Residence time (h) | 2.17 |
| wt % (A) | 49 |
| MI$_2$ (g/10 min) * | 400 |
| Density (kg/m$^3$) | 973 |
| Reactor 2 | |
| C2 (mol %) | 2.61 |
| C6/C2 (mol/mol %) | 137.3 |
| H2/C2 (mol/mol %) | 0.19 |
| T (° C.) | 85 |
| Residence time (h) | 0.87 |
| Final composition (base resin) | |
| MI$_5$ (g/10 min) * | 0.31 |
| Density (kg/m$^3$) | 948.5 |
| Comonomer content (mol %) | 0.60 |

* Measured according to ISO1133

TABLE 2

Pelletisation condition and properties of pelletised resins

| EXAMPLE | C1 | 2 | 3 | 4 |
|---|---|---|---|---|
| Pelletisation conditions | | | | |
| DHBP7.5 % IC5 Peroxide amount (ppm MB) | 0 | 400 | 700 | 1000 |
| Peroxide amount (ppm pure) | 0 | 30 | 53 | 75 |
| Carbon black content [wt %] | 2.2 | 2.1 | 2.2 | 2.2 |
| Total specific energy [kWh/t] | 278 | 278 | 279 | 280 |
| Max melt temperature [° C.] | 312 | 313 | 314 | 312 |
| Properties polymer composition after pelletisation - black compound | | | | |
| MI$_5$ (g/10 min)** | 0.29 | 0.26 | 0.25 | 0.24 |
| HLMI (g/10 min)** | 8.5 | 9.2 | 9.8 | 9.5 |
| HLMI/MI$_5$ | 29 | 35 | 38 | 40 |
| Density (kg/m$^3$) | 959.9 | 959.2 | 959.8 | 959.0 |
| G'(G" = 3000) (Pa) | 1,276 | 1,664 | 1,927 | 2,096 |
| η*$_{0.01}$ (Pa · s) | 185,778 | 215,823 | 257,745 | 299,653 |
| η*$_{100}$ (Pa · s) | 2,504 | 2,382 | 2,396 | 2,401 |
| SHI 2.7/210 (—) | 44 | 61 | 76 | 96 |
| η* at G* = 2.7 kPa (Pa · s) | 150,519 | 197,229 | 255,503 | 311,613 |
| η*$_{747}$ (kPa · s) | 280 | 446 | 647 | 889 |

TABLE 2-continued

Pelletisation condition and properties of pelletised resins

| EXAMPLE | C1 | 2 | 3 | 4 |
|---|---|---|---|---|
| NPT 80° C. - 9.2 bar on 110SDR11 pipes (h) | >8 800 | >8 800 | >8 800 | >8 800 |
| RCP S4 Critical Temperature on 110SDR11 pipes (° C.) | −17.5 | −27.5 | | −17.5 |
| creep at 20° C./12.4 MPa (h) | | 2,269 | 688 | 803 |
| creep at 20° C./12.1 MPa (h) | 2,632 | 3,080 | 2,139 | 3,066 |
| creep at 20° C./11.8 MPa (h) | >7,200 | >7,200 | >7,200 | >7,200 |
| creep at 80° C./5.7 MPa (h) | 207 | 490 | 1,236 | 4,066 |
| creep at 80° C./5.5 MPa (h) | >7,800 | >7,800 | >7,800 | >7,800 |

**measured according to ISO1133

Preparation of Natural Composition

The manufacture of a base resin II was carried out as described for base resin I above. Polymerization conditions and copolymer properties are presented in Table 3.

2.5-Dimethyl-2,5-di(tert-butylperoxy)hexane (DHBP) was incorporated to the powder particles and subsequently intensively mixed together prior in a Farrel FCM mixer. The balance of the additive formulation (primary antioxidant, etc.) is added via a separate feeder at the same location. This mixture of flake/additives/peroxide enters the mixer where the material is heated, melted, and mixed together. A polymer ribbon then leaves the mixer through the orifice and is fed to the extruder. The material is conveyed to the die where it is then pelletized. The processing time in the mixer and the extruder is defined as the residence time.

Table 4 presents data for reticulated samples and non-reticulated samples. These predictive rheological tools show no statistically significant difference in processing parameters while a significant shift in low shear viscosity is present. To confirm the predictive measurement for processability and to show that no loss in processability was experienced comparisons of pipe extrusion measurements of processability are shown in the Table 4. Furthermore, the predictive measurement for melt strength was examined and confirmed by the pipe extrusion data offered for reticulated and non-reticulated samples. The wall thickness improvements and similar processability show that a peroxide modified resin will exhibit improved melt strength with no loss of processability as expected from predictive rheological results.

TABLE 3

Polymerization conditions and properties for base polymer II

| EXAMPLE | II |
|---|---|
| Reactor 1 | |
| C2 (mol %) | 3.3 |
| H2/C2 (mol/mol %) | 47 |
| T (° C.) | 96 |
| wt % (A) | 49.5 |
| MI$_2$ (g/10 min) * | 400 |
| Density (kg/m$^3$) | 972 |
| Reactor 2 | |
| C2 (mol %) | 3.0 |
| C6/C2 (mol/mol %) | 130 |
| H2/C2 (mol/mol %) | 0.17 |
| T (° C.) | 85 |
| Final composition (base resin) | |
| MI$_5$ (g/10 min) * | 0.30 |
| Density (kg/m$^3$) | 949 |

* Measured according to ASTM D123

TABLE 4

| Example | C5 | 6 | 7 | 8 |
|---|---|---|---|---|
| Pelletization conditions | | | | |
| Peroxide amount (ppm pure) | 0 | 75 | 92 | 130 |
| Properties polymer composition (after pelletization - natural compound) | | | | |
| MI$_5$ (g/10 min)** | 0.26 | 0.26 | 0.19 | 0.22 |
| HLMI (g/10 min)** | 7.3 | 8.4 | 7.0 | 7.2 |
| HLMI/MI$_5$ | 27.6 | 32.6 | 36.6 | 32.9 |
| Density (kg/m$^3$) | 948.4 | 949.0 | 948.9 | 949.7 |
| G'(G" = 3000) (Pa) | 1,248 | 1,851 | 1,985 | |
| G'(G" = 5000) (Pa) | 2,370 | 3,378 | 3,834 | |
| η*$_{0.01}$ (Pa · s) | 187,073 | 261,190 | 364,960 | 428,436 |
| η*$_{100}$ (Pa · s) | 2304 | 2272 | 2,403 | 2,330 |
| Zero Shear Viscosity (η$_0$) (Pa · s) | 426,112 | 876,962 | 1,295,824 | 3,028,376 |
| SHI 2.7/210 | 39 | 91 | 115 | |
| η* at G* = 2.7 kPa (kPa · s) | 168.3 | 257.8 | 399.9 | |
| η*$_{747}$ (kPa · s) | | | 1,296 | |
| PENT Failure Time (h) | >10,000 | | >7,900 | >10,000 |

TABLE 4-continued

| Example | C5 | 6 | 7 | 8 |
|---|---|---|---|---|
| Pipe Extrusion Data | | | | |
| Typical Output Rates (lb/hr)** | 1,885 | 1,500 | 1,750 | 2,351 |
| Extruder Load (%) | 70 | 83 | 77 | 73 |
| Pipe Size | 28" DR 11 | 24" DR 5 | 30" DR9 | 48" DR 17 |
| Wall Thickness Limitation (inches) | 2.25" | 4.5" | 3.33"-4" or higher | 2.82"-3.5" or higher |

*Measured according to ASTM D1238
**Dependent on extruder capability, extruder size, pipe size and downstream cooling constraints.

Oxidative Resistance Testing

Chlorine resistance testing was performed in accordance with ASTM F2263-14 and as described above. Six samples prepared according to the parameters above were tested.

Two sets of 3 20-inch long samples were fusion welded together with 4-foot PE SDR 11 end caps on both pipe ends. Both sets were linked together with stainless steel tubing and connected to the chlorine testing station.

The samples were exposed to continuous flowing chlorinated Reverse Osmosis water and tested in a horizontal position. The water was at pH 7±0.2 and the free chlorine present was 3±0.2 mg/L. The nominal ORP was measured to be greater than 825 mV. The fluid temperature was 90° C.±1. The air temperature was 90° C.±1. The fluid and air temperatures were controlled at the same set-point. The water pressure was 95±1% psig. The flow rate was 0.1±10% USGPM. A stress test was conducted with a stress of 450 psi to assess the categorization. The results of the oxidative resistance testing are detailed in Table 5.

TABLE 5

| Sample | Stress (psi/MPa) | Failure Time (hr) |
|---|---|---|
| 1 | 450/3.1 | 6712 |
| 2 | 450/3.1 | 7598 |
| 3 | 450/3.1 | 7598 |
| 4 | 450/3.1 | 7598 |
| 5 | 450/3.1 | 7598 |
| 6 | 450/3.1 | 7598 |
| Log average test time (hr) | | 7442 |
| Category | | 3 |

As seen in Table 5, all pipes formed according to the present disclosure fall within category 3.

Wall Thickness Variability

Wall thickness variability for pipes formed according to this disclosure and prior art was measured and calculated in accordance with ASTM D2122-16, Standard Test Method for Determining Dimensions of Thermoplastic Pipe and Fittings. The results of the wall thickness variability measurements are disclosed in Table 6. Examples 1 and 4 in Table 6 are reference examples.

TABLE 6

| Example | Ref. 1 | 2 | 3 | Ref. 4 | 5 | 6 | 7 | 8 |
|---|---|---|---|---|---|---|---|---|
| Zone 1 (° F.) | 381 | 405 | 405 | | 415 | 400 | 405 | 405 |
| Zone 2 (° F.) | 371 | 380 | 380 | | 430 | 425 | 425 | 425 |
| Zone 3 (° F.) | 363 | 380 | 380 | | 380 | 380 | 380 | 380 |
| Zone 4 (° F.) | 365 | 380 | 380 | | 380 | 380 | 380 | 380 |
| Zone 5 (° F.) | 360 | 370 | 390 | | 375 | 375 | 375 | 375 |
| Die Zones (° F.) | 360 | 380 | 380 | | 375 | 375 | 375 | 375 |
| Screw RPM | 46 | 108.8 | 108.8 | 53 | 65 | 64 | 65 | 64 |
| Melt Temp (° F.) | 326 | 397 | 396 | 345 | 360 | 356 | 356 | 356 |
| Line Speed (lbs/hr) | 1885 | 2425 | 2340 | 2200 | 2400 | 2380 | 2360 | 2410 |
| Min Wall (in.) | 2.538 | 2.67 | 2.727 | | 2.052 | 2.069 | 2.058 | 2.098 |
| Max Wall (in.) | 3.105 | 2.916 | 2.853 | | 2.181 | 2.23 | 2.193 | 2.25 |
| Hot OD (in.) | 28.165 | 28.28 | 28.25 | | 42.235 | 42.03 | 42.03 | 42.08 |
| Cold OD (in.) | 27.94 | 28.12 | 27.875 | | 42.06 | 41.87 | 41.85 | N/A |
| Wall Thickness Range (%) | 22 | 9 | 5 | 9 | 6 | 7 | 6 | 6 |

As seen in Table 6, pipes formed according to the present disclosure unexpectedly and surprisingly exhibited wall thickness variabilities of 9% or lower—which is equal to or better than the reference examples—at higher line speeds than the reference examples.

Other embodiments will be apparent to those skilled in the art from consideration of the specification and practice of the present disclosure. It is intended that the specification and examples be considered as exemplary only, with a true scope and spirit of the invention being indicated by the following claims.

The invention claimed is:

1. An oxidative resistant article comprising a polyethylene polymer made with a resin comprising:

an ethylene polymer (A) having a density of at least about 968 kg/m$^3$ in an amount ranging from about 45% to about 55% by weight; and an ethylene polymer (B) having a density lower than the density of ethylene polymer (A), wherein the resin has a density of about 945 kg/m$^3$ to about 955 kg/m$^3$, a zero-shear viscosity (ηo) greater than about 800 kPa·s, a complex viscosity at a shear rate of about 0.01 rad/s ranging from about 200 to about 450 kPa·s, a complex viscosity at a shear rate of about 100 rad/s ranging from about 1900 to about 2600 Pa·s, a melt index $MI_5$ ranging from about 0.1 to about 0.5 g/10 min, and a high load melt index (HLMI) ranging from about 7 to about 11 g/10 min, wherein the article achieves oxidative resistance of at least category 1 when measured at a pressure of 2.48 MPa and a temperature of 90° C. according to ASTM D3350-14.

2. The article according to claim 1, wherein the article is selected from the group consisting of a pipe and a pipe fitting.

3. The article according to claim 1, wherein the article achieves oxidative resistance ranging from category 1 to category 3 when measured at a pressure of 2.48 MPa and a temperature of 90° C. according to ASTM D3350-14.

4. The article according to claim 1, wherein the article achieves oxidative resistance of at least category 1 when measured at a pressure of 2.76 MPa and a temperature of 90° C. according to ASTM D3350-14.

5. The article according to claim 1, wherein the article achieves oxidative resistance ranging from category 1 to category 3 when measured at a pressure of 2.76 MPa and a temperature of 90° C. according to ASTM D3350-14.

6. The article according to claim 1, wherein the article achieves oxidative resistance of at least category 1 when measured at a pressure of 3.1 MPa and a temperature of 90° C. according to ASTM D3350-14.

7. The article according to claim 1, wherein the article achieves oxidative resistance ranging from category 1 to category 3 when measured at a pressure of 3.1 MPa and a temperature of 90° C. according to ASTM D3350-14.

8. The article according to claim 1, wherein the article exhibits a minimum required strength (MRS) according to ISO 9080 at 20° C. of at least about 10 MPa (1450 psi).

9. The article according to claim 1, wherein the article exhibits a hydrostatic design basis (HDB) according to ASTM D2837 at 23° C. of at least about 11 MPa (1600 psi).

10. The article according to claim 2, which is a pipe having a diameter greater than 24 inches.

11. The article according to claim 2, wherein the pipe has a wall thickness greater than 2.25 inches.

12. The article of claim 1, wherein the ethylene polymer (A) has a density of at least about 971 kg/m³ and the ethylene polymer (B) has a density lower than the density of ethylene polymer (A), wherein the ratio of ethylene polymer (A) to ethylene polymer (B) ranges from 45:55 to 55:45.

13. The article according to claim 12, wherein ethylene polymer (A) has a melt index ($MI_2$) of about 200 to about 600.

14. The article according to claim 12, wherein the resin has a melt elastic modulus (G') at a reference melt viscous modulus (G") value of G"=3000 Pa ranging from about 1600 to about 2500 Pa.

15. The article according to claim 12, wherein the resin has a minimum required strength (MRS) according to ISO 9080 at 20° C. of at least about 10 MPa (1450 psi).

16. The article according to claim 1, wherein the article possesses a wall thickness variability of between about 3% and about 12% when measured at 23° C. and 50% relative humidity, and a production output of at least 2300 lbs/hr.

17. A polyethylene polymer article made with a resin comprising:

an ethylene polymer (A) having a density of at least about 968 kg/m³ in an amount ranging from about 45% to about 55% by weight; and an ethylene polymer (B) having a density lower than the density of ethylene polymer (A), wherein the resin has a density of about 945 kg/m3 to about 955 kg/m3, a zero-shear viscosity (ηo) greater than about 800 kPa·s, a complex viscosity at a shear rate of about 0.01 rad/s ranging from about 200 to about 450 kPa·s, a complex viscosity at a shear rate of about 100 rad/s ranging from about 1900 to about 2600 Pas, a melt index $MI_5$ ranging from about 0.1 to about 0.5 g/10 min, and a high load melt index (HLMI) ranging from about 7 to about 11 g/10 min, wherein the article possesses a wall thickness variability of between about 3% and about 12% when measured at 23° C. and 50% relative humidity, and a production output of at least about 2300 lbs/hr.

18. The article according to claim 17, wherein the article is selected from the group consisting of a pipe and a pipe fitting.

19. The article according to claim 18, wherein the article possesses a wall thickness variability of between about 5% and about 9% when measured at 23° C. and 50% relative humidity.

20. The article according to claim 17, wherein the article exhibits a minimum required strength (MRS) according to ISO 9080 at 20° C. of at least about 10 MPa (1450 psi).

21. The article according to claim 17, wherein the article exhibits a hydrostatic design basis (HDB) according to ASTM D2837 at 23° C. of at least about 11 MPa (1600 psi).

22. The article according to claim 17, which is a pipe having a diameter greater than 24 inches or a wall thickness greater than 2.25 inches or both.

23. The article according to claim 17, wherein ethylene polymer (A) has a melt index ($MI_2$) ranging from about 200 to about 600.

24. The article according to claim 17, wherein the resin has a melt elastic modulus (G') at a reference melt viscous modulus (G") value of G"=3000 Pa ranging from about 1600 to about 2500 Pa.

25. The article according to claim 24, wherein the resin has a minimum required strength (MRS) according to ISO 9080 at 20° C. of at least about 10 MPa (1450 psi).

* * * * *